US009659456B2

(12) United States Patent
Van Linden

(10) Patent No.: US 9,659,456 B2
(45) Date of Patent: May 23, 2017

(54) GAMING SYSTEM WITH IMPROVED WAGER MECHANISM

(75) Inventor: Lucien M Van Linden, Maasland (NL)

(73) Assignee: GAMING SUPPORT B.V., Rotterdam (NL)

( * ) Notice: Subject to any disclaimer, the term of this patent is extended or adjusted under 35 U.S.C. 154(b) by 231 days.

(21) Appl. No.: 12/706,933

(22) Filed: Feb. 17, 2010

(65) Prior Publication Data

US 2011/0201402 A1 Aug. 18, 2011

(51) Int. Cl.
*A63F 13/00* (2014.01)
*G07F 17/32* (2006.01)

(52) U.S. Cl.
CPC ...... *G07F 17/3265* (2013.01); *G07F 17/3213* (2013.01)

(58) Field of Classification Search
CPC .................................................. G07F 17/3265
USPC ............................................................ 463/20
See application file for complete search history.

(56) References Cited

U.S. PATENT DOCUMENTS

| | | | | |
|---|---|---|---|---|
| 6,676,512 | B2 * | 1/2004 | Fong et al. | 463/20 |
| 2002/0045474 | A1 * | 4/2002 | Singer et al. | 463/20 |
| 2004/0176155 | A1 * | 9/2004 | Gold et al. | 463/13 |

* cited by examiner

*Primary Examiner* — Milap Shah
*Assistant Examiner* — Thomas H Henry
(74) *Attorney, Agent, or Firm* — Nixon & Vanderhye P.C.

(57) ABSTRACT

A gaming system comprising presentation means for presenting selected symbols from a first and a second symbol reel with respective first and second sets of symbols in a display area, outcome determination means for determining an outcome from a first win line symbol from the first set and a second win line symbol from the second set, being the symbols from the first and second sets that are positioned along a win line in the display area, outcome replacement means for, upon occurrence of a predetermined event, selecting for the first win line symbol a first replacement symbol, selecting for the second win line symbol a second replacement symbol and causing the output determination means to determine the outcome from the first and second replacement symbols, wherein the first and second replacement symbols are positioned at an equal distance from the first and second win line symbols respectively.

19 Claims, 2 Drawing Sheets

GAMING SYSTEM WITH IMPROVED WAGER MECHANISM

FIELD OF THE INVENTION

The invention relates to a gaming system comprising presentation means for presenting selected symbols from a first and a second symbol reel with respective first and second sets of symbols in a display area and outcome determination means for determining an outcome from a first win line symbol from the first set and a second win line symbol from the second set, being the symbols from the first and second sets that are positioned along a win line in the display area.

BACKGROUND OF THE INVENTION

Many types of gaming systems exist that let players place a wager on particular randomly selected symbol arrangements. The most common examples of these types are the so-called slot machines or fruit machines. Slot machines present several wheels or strips with symbols on them in a display area. After rotating or otherwise changing the display for a certain time, the symbols currently visible in the display area present certain combinations along certain lines, known as pay lines or win lines. If a player has selected one or more of those win lines before initiating the display change, he wins the game and may receive a monetary amount or other prize.

Slot machines may embody the symbol carriers as physical reels or wheels that rotate along a physical axis, or as virtual reels generated as computer images and displayed on the display area which is embodied as a display screen. The latter kind is commonly known as a video slot machine.

Early gaming systems would provide only a single win line: a horizontal line through the symbols lining up in the center of the display area. An example of such an arrangement is shown in FIG. 1: in display area 101 three reels are shown, with a win line 102 passing through the center of the display area 101. When the three reels stop rotating, the symbol arrangement underneath the win line 102 determines which prize, if any, the player has won. Certain winning combinations are illustrated to the right of the display area 101.

FIG. 2 shows an example of a gaming system's display with five reels, with three symbols on each reel visible at the same time. In this example, a player can place a wager on up to 25 different win lines. For example, win lines in FIG. 2 may run through the center as in FIG. 1 but may also run from top left to bottom right, or weave across the symbols in various arrangements, e.g. from top left to middle bottom to top right or across top left, top second, middle middle, bottom fourth and bottom right. Multiple win lines can be provided simultaneously, allowing players to wager on any, some or all of them.

Commonly game outcomes only include combinations of symbols consisting of at most one symbol from each reel. U.S. Pat. No. 5,611,535 proposes a compound win line that is associated with more than one symbol on a single reel. Thus, a winning game outcome can require, for example, a combination that includes two or more particular symbols from a single reel.

The symbol strips may be provided as actual wheels that rotate along an axis, or as a sequence of images displayed on a screen. For example, U.S. Pat. No. 5,807,172 discloses a method for operating a slot machine which allows a player nine ways to win for a 3-reel slot machine, where the reels are provided as actual wheels. Today virtually all such gaming systems employ electronic screens because of the flexibility they provide. Symbols can be replaced, the reels can be made much longer and many variations in win lines and winning combinations can be created using software and electronic screens. U.S. Pat. No. 4,711,451 provides an optimized implementation of a stopping mechanism for real or computer-generated ("virtual") reels.

In addition, much thought has been put into devising ways to vary win lines to encourage player enthusiasm. U.S. Pat. No. 6,261,178 discloses an additional win line known as a "mystery line", which is a randomly selected combination of symbol positions. A prize is paid to the player in the event that a predetermined combination of symbols is displayed in the randomly selected arrangement of symbol locations. U.S. Pat. No. 6,227,971 discloses a gaming device with two games, where certain symbols in the first game can be added to win lines in the second game. U.S. Pat. No. 6,832,957 discloses a gaming device with multiple sets of identical reels, allowing the player to wager on win lines on one or more of said sets of reels, and on predetermined combinations of gaming symbols which occur over the plurality of sets of reels.

Changing win lines may change the odds of winning combinations. U.S. Pat. No. 6,413,162 proposes to remove either the vertical or horizontal win lines, preferably the vertical win lines in order to equalize the odds of winning on any particular win line. U.S. Pat. No. 5,085,436 allows for the probability of winning combinations to be altered without changing the number of physical symbols per reel, or alternatively that the number of physical symbols per reel may be decreased, with a consequential increase in symbol size, without altering the probability of winning combinations provided on the machine occurring.

With more complex win line arrangements, allowing the player to select the desired line(s) becomes an issue worthy of attention. U.S. Pat. No. 6,093,102 discloses an arrangement whereby the number of win lines provided on a slot machine, particularly a machine with a display with 3 times 5 symbols, can be increased without changing the display format. This is achieved by allowing selection of individual symbols rather than particular lines, and by creating win lines from the selection of symbols.

However attractive such arrangements may be, there still is a need to improve gaming systems of the above-disclosed type.

SUMMARY OF THE INVENTION

The invention provides for a gaming system comprising presentation means for presenting selected symbols from a first and a second symbol reel with respective first and second sets of symbols in a display area, outcome determination means for determining an outcome from a first win line symbol from the first set and a second win line symbol from the second set, being the symbols from the first and second sets that are positioned along a win line in the display area, outcome replacement means for, upon occurrence of a predetermined event, selecting for the first win line symbol a first replacement symbol, selecting for the second win line symbol a second replacement symbol and causing the output determination means to determine the outcome from the first and second replacement symbols, wherein the first and second replacement symbols are positioned at an equal distance from the first and second win line symbols respectively.

By replacing the first and second win line symbols currently on the win line with replacement symbols from elsewhere on the reel, player excitement is increased as the replacement provides an extra chance of winning. What's more, because the distance traversed from the win line symbol to its replacement symbol is the same during multiple rounds of play, the player may develop a belief that he can predict the replacement symbols. He may for instance remember that a "lemon" symbol was replaced with a "bell" symbol last time, and if the "bell" symbol along the win line would provide a winning combination, he may choose to initiate replacement of the currently-displayed "lemon". Of course the distance may be varied over time, as long as one keeps in mind that this may lead to player disappointment.

Distance may be expressed in various ways, for example degrees or centimeters. If symbols are not spaced equally on the reel, the distance is preferably expressed as number of symbols to traverse before arriving at the replacement symbol.

In an embodiment each reel is provided in the form of a closed ellipse, preferably a circle, and the equal distance is a predetermined number of degrees from the position of the first and second symbols on the first and second reels respectively. By employing a closed ellipse form factor, selecting replacement symbols is as easy as traveling along the ellipse for a given angle corresponding to the equal distance. Of particular advantage is the embodiment where the ellipse is completely circular and the predetermined number of degrees is 180 degrees, as this can most easily be presented to players: one "shows the back" of the reels by rotating a circular reel 180 degrees.

In another embodiment each reel is provided in computer memory as a respective array of symbols and the first and second win line symbols are determined by selecting an entry in the first and second arrays of symbols, and the equal distance is calculated by adding to the positions of the first and second win line symbols a predetermined number to arrive at a replacement position on the first and second symbol reels, said adding being modulo the total number of symbols on the first and second symbol reels. This type of computer implementation makes it efficient to select the replacement symbol.

The invention further advantageously provides a computer program product comprising machine-executable instructions to enable a programmable device to implement the invention. The program product comprises instructions for registering data representative of non-winning outcomes of playing said one or more games, and for providing a bonus delivery signal to bonus delivery means that the registered data match certain criteria so as to cause the bonus delivery means to deliver a bonus. The product is preferably recorded on a storage medium such as a semiconductor memory device, magnetic disk, magneto-optical disks and CD-ROM disks.

BRIEF DESCRIPTION OF THE FIGURES

The invention will now be elaborated upon with reference to the figures, in which.

DETAILED DESCRIPTION OF CERTAIN EMBODIMENTS

Figure 1:
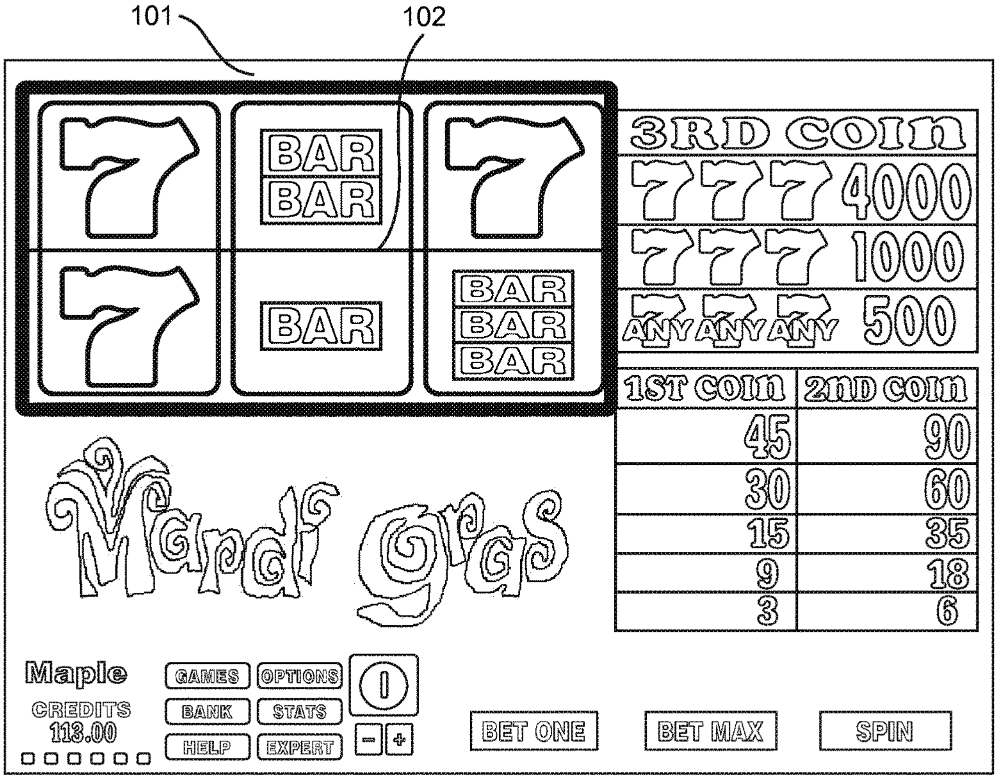
FIG. 1 shows an example of a gaming system display area with three reels and a win line passing through the center of the display area.
Figure 2:
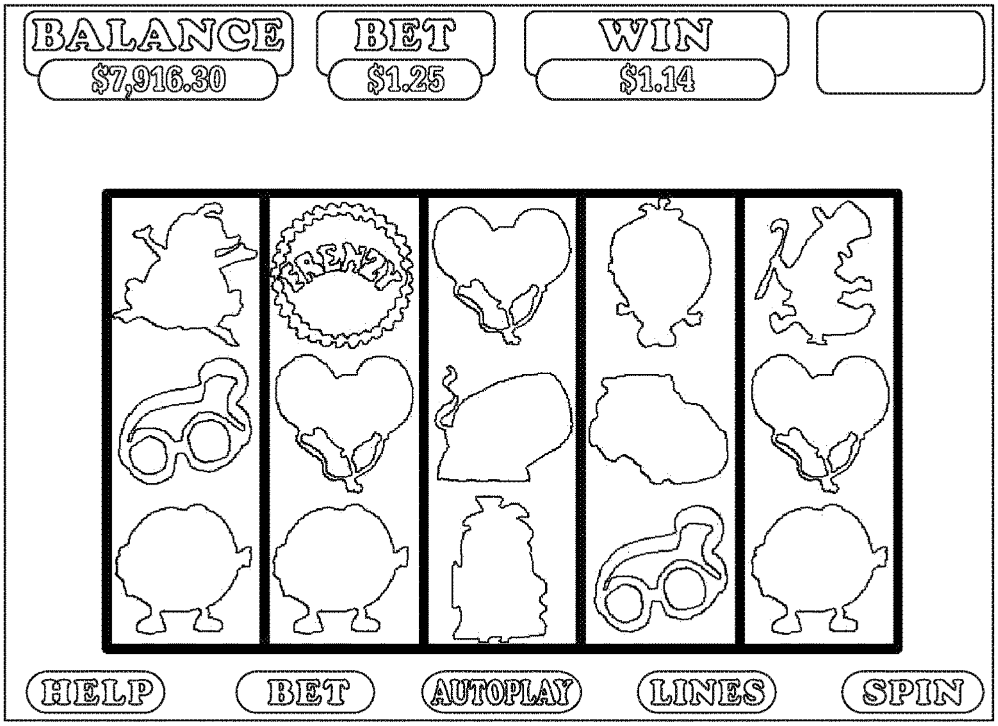
FIG. 2 shows an example of a gaming system's display with five reels, with three symbols on each reel visible at the same time.
Figure 3:
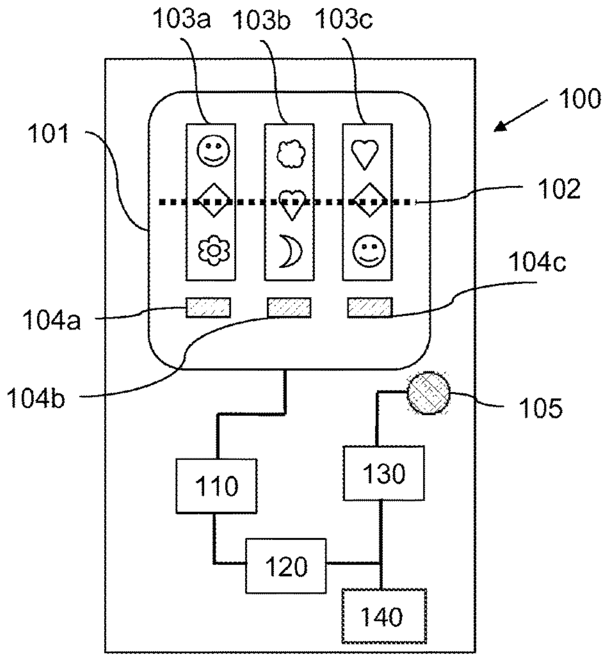
FIG. 3 schematically shows a gaming system.

FIG. 3 schematically shows a gaming system 100, allowing playing of a game where symbols from three reels 103*a*, 103*b*, 103*c* must be arranged along win line 102 in display area 101 in particular patterns to provide a winning outcome. A round in the game involves randomly selecting certain symbols from the reels 103*a*, 103*b*, 103*c* and displaying those in the display area 101. In embodiments where the reels are virtual reels generated as computer images, the selection is accompanied by a fanciful display, for example by providing an animated view of the reels passing by to simulate a rotation of the reels. While no actual rotation takes place in such embodiments, this disclosure will still use the phrase "rotate" to indicate the operation in question. If the reels 103*a*, 103*b*, 103*c* are embodied as physical ellipsoid or circular discs, the selection may be executed by actually rotating the discs for a certain period or over a certain distance before stopping them. Such distance can be expressed in centimeters, inches, degrees or other unit as desired.

The player can elect to "hold" one or more of the reels 103*a*, 103*b*, 103*c* by using hold buttons 104*a*, 104*b*, 104*c* respectively. Symbols selected from held reels remain unchanged between rounds for as long as they are held.

Optionally, the gaming system 100 further comprises a payment module 140 (shown in FIG. 3) through which the user must provide payment in order to be allowed to play the game. This payment module 140 can be implemented, e.g., as a coin or paper money slot or a credit card reader. The gaming system 100 may be configured to deliver an amount of money, e.g., from the payment module 140 or from a separate jackpot, a prize or in-game enhancements, if the player has selected one or more win lines that pass through a winning combination of symbols or replacement symbols from the reels 103*a*, 103*b*, 103*c*.

The gaming system 100 is kept simple to keep the disclosure brief. The skilled person will understand that many, many variations in the gaming system 100 are possible, for example by using more than three reels, providing multiple or more complex win line arrangements, adding secondary games, multi-machine games or bonus games, and so on.

The gaming system 100 comprises a presentation module 110 which is configured to present selected symbols from the symbol reels 103*a*, 103*b*, 103*c* in the display area 101. In the example of FIG. 3, three symbol from each reel are selected and presented. The gaming system 100 further comprises an outcome determination module 120 which is configured to determine an outcome of a particular game. The outcome is determined from those symbols from the reels 103*a*, 103*b*, 103*c* that are positioned along the win line or win lines in the display area 101 that the player has selected. Those symbols will be referred to as "win line symbols" below. In the example shown in FIG. 3, the player would win if the symbols underneath the win line 102, i.e. diamond-heart-diamond, form a winning combination. Whether this is the case, depends on how the module 120 is configured, which is well within the capabilities of the skilled person.

If the symbols appearing underneath one or more win lines selected by the player match a winning combination, the player wins the game and may receive a monetary amount or other prize, for example a car, a boat or electronic equipment, credits for further playing or in-game enhancements such as more powerful weapons, extra lives or access to special levels or challenges. The amount or prize may increase in value if the player has selected multiple win lines that match a winning combination.

In one embodiment, the reels 103*a*, 103*b*, 103*c* are provided as physical wheels in a closed elliptical shape, preferably a circular shape. The symbols are then printed on the wheels. The display area 102 then provides a view on the wheels as they rotate and come to a stop.

In another embodiment, the reels 103*a*, 103*b*, 103*c* are provided in computer memory as respective arrays of symbols, individually accessible through pointers or similar computer data access and manipulation techniques. An advantage of this embodiment is that arrays in computer memory can be much larger than physical wheels with symbols printed thereon. One may even vary the composition of the reels from time to time, for example increasing or decreasing odds of winning combinations.

This embodiment can optionally benefit from the teachings of U.S. Pat. No. 6,120,378, where a player can select none, one or more of the symbols from the first win line as symbols to be held. The symbols that are held are duplicated from the first win line into all of the other win lines on which the player has wagered. Replacement symbols for the non-selected symbols are then randomly displayed on the first win line for the symbols that were discarded. Additional symbols are also randomly displayed into all of the other win lines wagered on by the player so that each win line has the required number of symbols.

An outcome replacement module 130 is provided which is configured to select replacement symbols for the symbols currently positioned along the win line 102. The outcome replacement module 130 then activates the output determination module 120 to (re-)determine the outcome on the basis of the replacement symbols instead of the originally selected symbols on the win line 102. Optionally, if any of the reels 103*a*, 103*b*, 103*c* were held using hold buttons 104*a*, 104*b*, 104*c* the symbols on those reels are not replaced by replacement symbols. The player now wins if the player has selected one or more win lines that pass through a winning combination of replacement symbols.

Activation of the outcome replacement module 130 preferably is left at the discretion of the player. Of course he or she may be encouraged to do so if no winning outcome is provided. Activation by the player of the outcome replacement module 130 may be discouraged or even prevented if the original arrangement of symbols provides a winning outcome, as this could cause the winning outcome to change in a non-winning outcome. Automatic activation of the outcome replacement module 130 could be employed e.g. if certain specific outcomes are achieved.

The outcome replacement module 130 could be used to provide a bonus game, whose result is determined in addition to the result of the original game. The player could then win two prizes if both the combination of original symbols and the combination of replacement symbols prove winning.

The replacement symbols are selected by moving on each reel 103*a*, 103*b*, 103*c* an equal distance from the originally selected symbols. The distance can be chosen in a variety of ways, but is preferably chosen such that the first and second replacement symbols are not among the selected symbols in the display area. The symbols that appear on the reels 103*a*, 103*b*, 103*c* after such moving are then selected as the replacement symbols. This will be discussed in more detail with reference to FIG. 4, which shows an embodiment of reel 103*a* in more detail. It will be understood that what is said here of reel 103*a* of course equally applies to reels 103*b* and 103*c*.

In the embodiment of FIG. 3, an input element 105 is provided that activates the outcome replacement module 103. Alternatively other events may be used to activate the outcome replacement module 103. For example, if a non-winning outcome is initially provided in the display area 101, the outcome determination module 120 may automatically activate the outcome replacement module 103. This should occur preferably when a certain condition is met, for example twenty non-winning outcomes occurred in a row or a random number generator (not shown) provided a particular number.

Usually, the replacement symbols thus selected are shown in place of the originally selected symbols. However, alternatively the replacement symbols may be shown in a further display area, e.g. a secondary display (not shown) attached to the side of gaming system 100 or a picture-in-picture display positioned inside the display area 121. This alternative embodiment retains the original outcome for reference and provides the replacement option as an extra or bonus game. This is particularly suitable if the original outcome is a winning outcome and the symbol replacement is effected to provide a bonus to the original winning.

Figure 4:
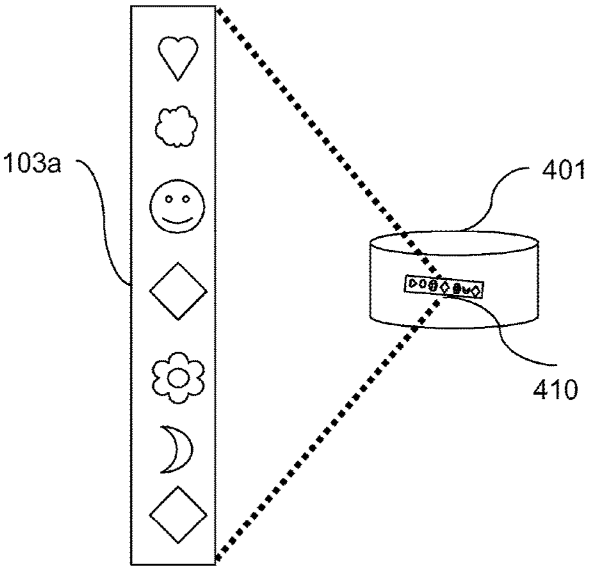
FIG. 4 schematically shows an embodiment of an individual reel in the gaming system of FIG. 3.

As embodied in FIG. 4, reel 103*a* has seven symbols, the third, fourth and fifth of which were selected and presented in the embodiment of FIG. 3. The fourth symbol (the diamond) is on the win line 102. Reel 103*a* is stored as an array 410 in computer memory 401, which can be added to gaming system 100. Selection of the fourth symbol occurred by (pseudo-)randomly generating a number between one and seven and picking the symbol corresponding to this generated number. By itself, such symbol selection is well-known.

In accordance with the present invention, now a replacement symbol for the selected diamond symbol is selected from the reel 103*a* by moving a given distance along the reel. In the embodiment of FIG. 4, this is preferably done by adding a predetermined number to the generated random number that originally picked symbol four, the diamond. For example, the predetermined number may be 'two', i.e. the replacement symbol is selected by moving two symbols along the reel 103*a*. This would cause the replacement symbol to be selected as the seventh symbol, i.e. the "moon" symbol in FIG. 4.

In this embodiment, distance is expressed as number of symbols to traverse before arriving at the replacement symbol. This also accommodates further embodiments where the distance between symbols is not always equal. Depending on implementation other ways to express this distance are possible. For embodiments with physical discs, as in FIG. 5 below, a distance expressed in degrees or centimeters may be more appropriate as it is easier to configure gaming machines of such embodiments to rotate for certain angles or certain lengths.

Because there are only a limited number of symbols on the reel 103*a*, such adding is preferably done modulo the number of symbols on the reel 103*a*. If the predetermined number was five instead of two, the replacement symbol would be selected as the second symbol, i.e. the "cloud" symbol in FIG. 4. Alternatively to adding modulo the number of symbols, one may subtract rather than add if the sum would exceed the number of symbols. A similar approach is to be used if rotation is done based on angles or physical distances.

Preferably the predetermined number is half the total number of symbols on the reel. This provides for a user experience similar to rotating the originally selected symbol to its opposite on a circular disc. In case the total number of symbols is odd, one may 'halve' by rounding up or down. In the example of FIG. 4, preferably the predetermined number is rounded up to four as this avoids the diamond at the fourth position to be replaced by the seventh symbol which is also a diamond. Preferably however odd numbers of symbols are avoided.

The distance traveled along the reel may be varied over time, for example after a certain number of games played, after a game with a winning outcome, after a certain amount of time (e.g. one hour or one day) or after receiving an instruction to that effect from an operator. The instruction then could comprise the variation itself, or the variation may be pre-programmed or generated randomly after receiving the request. If and when the distance changes, preferably the player is informed so that he can keep this change into account. Alternatively, the player is not informed and the changed distance is announced after the fact in an attempt to increase player excitement.

Figure 5:
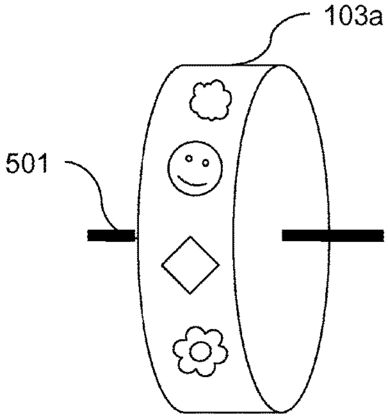
FIG. 5 schematically shows another embodiment of an individual reel in the gaming system of FIG. 3.

FIG. 5 shows another embodiment of reel 103*a*. In this embodiment reel 103*a* is provided as a physical disc with the form factor of a closed ellipse, in particular a circle. The reel 103*a* now rotates along axis 501 and is stopped to select the originally selected symbols as shown in FIG. 3. Such rotating is typically done using a stepping motor (not shown) or other driving mechanism. The outcome replacement module 103 now activates this driving mechanism to cause the reel 103*a* to be rotated a predetermined number of degrees from the position in which it was stopped to select the originally selected symbols. Preferably this predetermined number of degrees is 180 degrees to effect rotation to the exact opposite of the side shown in display area 102.

The above provides a description of several useful embodiments that serve to illustrate and describe the invention. For the sake of brevity, well-known methods, procedures, components, and circuits have not been described in detail. The description is not intended to be an exhaustive description of all possible ways in which the invention can be implemented or used. The skilled person will be able to think of many modifications and variations that still rely on the essential features of the invention as presented in the claims. Moreover, parts of the processing of the present invention may be distributed over multiple computers or processors for better performance, reliability, and/or cost.

The above-disclosed gaming system 100 can be implemented by adding a computer program product that provides the functionality of the outcome replacement module 130 to an existing gaming system. Such a computer program product is a collection of computer program instructions stored on a computer readable storage device for execution by a computer. These instructions may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs.

The computer program product may be provided to the gaming system recorded on a machine-readable storage device. Machine-readable storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible. To this end one may connect a server system comprising the storage medium discussed above to a network, and arrange this server for allowing the instructions to be downloaded to client systems connected directly or indirectly to the network.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A gaming system comprising:

a presentation module that presents in a display area selected symbols from first and second symbol reels provided with respective first and second sets of symbols, an outcome determination module that determines an outcome based on a first win line symbol from the first set of symbols of the first symbol reel positioned along a win line in the display area and on a second win line symbol from the second set of symbols of the second symbol reel also positioned along a win line in the display area, wherein the outcome determination module determines whether or not a user of the gaming system has won a prize, and if so, the prize the user has won based on an initial symbol arrangement formed from the first and second win line symbols positioned along the win line in the display area, without the first and second win line symbols being replaced by other symbols, an outcome replacement module which is different from the outcome determination module, and which is activated by an input from the user so as to always select both a first replacement symbol for the first win line symbol and a second replacement symbol for the second win line symbol, and thereby cause the outcome determination module to determine whether or not the user has won a prize, and if so, the prize the user has won based on a replacement symbol arrangement formed from the first and second replacement symbols, the first and second replacement symbols being located an equal distance from the first and second win line symbols, respectively, along the first and second symbol reels, respectively, the equal distance being chosen such that the first and second replacement symbols are not among the symbols in the display area with the first and second win line symbols, and a payment module through which the user provides a coin, paper money and/or credit card payment to use the gaming system and by which the gaming system delivers a winning payment to the user when the outcome determination module determines whether or not the user has won a prize, and if so, the prize the user has won based on either the first and second win line symbols or the first and second replacement symbols being part of the initial or replacement symbol arrangement used by the output determination system to determine that the user has won a prize, whereby activation of the outcome replacement module by the user allows the user to seek an extra chance of winning based on the selected first and second replacement symbols.

2. The gaming system of claim 1, wherein each of the first and second symbol reels is provided in the form of a closed ellipse, and wherein the equal distance is a predetermined number of degrees from a position of the first and second win line symbols of the first and second symbol reels, respectively.

3. The gaming system of claim 2, wherein the closed ellipse forms a circle and the predetermined number of degrees is 180.

4. The gaming system of claim 1, wherein each of the first and second symbol reels is provided in computer memory as a respective array of symbols, and wherein the first and second win line symbols are determined by selecting an entry in the first and second arrays of symbols, and wherein the equal distance is calculated by adding a predetermined number to the positions of the first and second win line symbols to arrive at a replacement position on the first and second symbol reels, and wherein the adding being modulo the total number of symbols on the first and second symbol reels.

5. The gaming system of claim 4, wherein the predetermined number is half the total number of symbols on the first symbol reel.

6. The gaming system of claim 1, where the first and second replacement symbols are shown in a further display area.

7. The gaming system of claim 1, wherein the outcome replacement system operable in response to the user input and a predetermined non-winning result.

8. The gaming system of claim 1, wherein the payment module is a coin slot, a paper money slot and/or a credit card reader.

9. The gaming system of claim 1, wherein the gaming system is further configured to deliver a winning payment from a separate jackpot, or a winning prize or winning in-game enhancements.

10. The gaming system of claim 1, wherein the outcome replacement system is activatable by the user of the gaming system.

11. The gaming system of claim 1, wherein the outcome replacement system is alternately activatable upon an occurrence of a predetermined event.

12. The gaming system of claim 1, wherein occurrence of the predetermined event is met where a predetermined number of non-winning outcomes occurred in a row or where a random number generator provided a particular number.

13. The gaming system of claim 1 further comprising first and second hold buttons corresponding to the first and second symbol reels, and wherein the outcome replacement module, when activated, selects both the first replacement symbol for the first win line symbol and the second replacement symbol for the second win line symbol, except when the first hold button and/or the second hold button are/is activated.

14. A computer program product stored on a non-transitory computer-readable medium for use with a gaming system, the gaming system comprising:

a presentation module that presents in a display area selected symbols from first and second symbol reels provided with respective first and second sets of symbols, an outcome determination module which determines an outcome based on a first win line symbol from the first set of symbols of the first symbol reel initially positioned along a win line in the display area and on a second win line symbol from the second set of symbols of the second symbol reel also initially positioned along a win line in the display area, wherein the outcome determination module determines whether or not a user of the gaming system has won a prize, and if so, the prize the user has won based on an initial symbol arrangement formed from the first win line symbol and the second win line symbol that are positioned along the win line in the display area, without either of the first and second win line symbols being replaced by another symbol, and a payment module through which the user provides a coin, paper money and/or credit card payment to use the gaming system and by which the gaming system delivers a winning payment to the user, the computer program product comprising:

an outcome replacement module, which is different from the outcome determination module, and which is activated by an input from the user, so as to always select both a first replacement symbol for the first win line symbol and a second replacement symbol for the second win line symbol, and thereby cause the output determination module to determine whether or not the user has won a prize, and if so, the prize the user has won based on a replacement symbol arrangement formed from the first and second replacement symbols, the first and second replacement symbols being located an equal distance from the first and second win line symbols, respectively, along the first and second symbol reels, respectively, the equal distance being chosen such that the first and second replacement symbols are not among the symbols in the display area with the first and second win line symbols, the payment module delivering a winning payment to the user when the outcome determination module determines whether or not the user has won a prize, and if so, the prize the user has won based on either the first and second win line symbols or the first and second replacement symbols being part of the initial or replacement symbol arrangement used by the output determination module to determine that the user has won a prize, whereby activation of the outcome replacement module by the user allows the user to seek an extra chance of winning based on the selected first and second replacement symbols.

15. The computer program product of claim 14, wherein the gaming system payment module is a coin slot, a paper money slot and/or a credit card reader.

16. The computer program product of claim 14, wherein the gaming system is further configured to deliver a winning payment from a separate jackpot, or a winning prize or winning in-game enhancements.

17. A storage system comprising a non-transitory computer readable medium and a computer program product for use with a gaming system, the computer program product being stored on the computer-readable medium, the gaming system comprising:

a presentation module that presents in a display area selected symbols from first and second symbol reels provided with respective first and second sets of symbols, and an outcome determination module that determines an outcome based on a first win line symbol from the first set of symbols of the first symbol reel positioned along a win line in the display area and on a second win line symbol from the second set of symbols of the second symbol reel also positioned along a win line in the display area, wherein the outcome determination module determines whether or not a user of the gaming system has won a prize, and if so, the prize the user has won based on an initial symbol arrangement formed from the first win line symbol and the second win line symbol that are initially positioned along the win line in the display area, without either of the first and second win line symbols being replaced by another symbol, and a payment module through which the user provides a coin, paper money and/or credit card payment to use the gaming system and by which the gaming system delivers a winning payment to the user, the computer program product comprising:

an outcome replacement module, which is different from the outcome determination module, and which is activated by an input from the user so as to always select both a first replacement symbol for the first win line symbol and a second replacement symbol for the second win line symbol, and thereby cause the output determination module to determine whether or not the user has won a prize, and if so, the prize the user has won based on a replacement symbol arrangement formed from the first and second replacement symbols, the first and second replacement symbols being located an equal distance from the first and second win line symbols, respectively, along the first and second symbol reels, respectively, the equal distance being chosen such that the first and second replacement symbols are not among the symbols in the display area with the first and second win line symbols, the payment module delivering a winning payment to the user when the outcome determination module determines whether or not the user has won a prize, and if so, the prize the user has won based on either the first and second win line symbols or the first and/or second replacement symbols being part of the initial or replacement symbol arrangement used by the output determination module to determine that the user has won a prize, whereby activation of the outcome replacement module by the user to have one or more specific replacement symbols selected allows the user to seek an extra chance of winning based on the one or more specific replacement symbols.

18. The storage system of claim 17, wherein the gaming system payment module is a coin slot, a paper money slot and/or a credit card reader.

19. The storage system of claim 17, wherein the gaming system is further configured to deliver a winning payment from a separate jackpot, or a winning prize or winning in-game enhancements.

* * * * *